United States Patent [19]

Norinsky

[11] 3,989,174
[45] Nov. 2, 1976

[54] CONVERTIBLE SADDLE BRIEF CASE

[76] Inventor: Sidney Norinsky, 110 W. 96th St., New York, N.Y. 10025

[22] Filed: Feb. 6, 1975

[21] Appl. No.: 547,655

[52] U.S. Cl............................... 224/31; 224/32 A; 224/35; 150/1.6
[51] Int. Cl.².................................... B62J 9/00
[58] Field of Search............... 224/35, 31, 32 A, 43, 224/44, 32 R, 30 R, 30 A, 42.11; 150/1, 1.6

[56] References Cited
UNITED STATES PATENTS

| 424,324 | 3/1890 | Marshall | 224/44 |
|---|---|---|---|
| 1,485,067 | 2/1924 | Bristol | 224/35 UX |

FOREIGN PATENTS OR APPLICATIONS

| 267,224 | 3/1965 | Australia | 224/35 |
|---|---|---|---|
| 438,870 | 11/1925 | Germany | 224/35 |
| 580,343 | 9/1946 | United Kingdom | 224/43 |

Primary Examiner—Robert J. Spar
Assistant Examiner—Jerold M. Forsberg
Attorney, Agent, or Firm—Paul J. Sutton

[57] ABSTRACT

The present invention includes a convertible saddle briefcase capable of use, at the option of the user, as either a saddle-type support bag upon a wheeled vehicle having one or more support members, and a briefcase. A pair of housing receptacles are spaced from one another and joined by a web member which interconnects them at predetermined points thereof. Handles provide means for supporting both of said housing receptacles such that each may accommodate and hold articles of a selected size and shape. The web member is capable of supporting the housing receptacles in hanging positions on either side of a support member, while further being capable of folding to functionally and aesthetically providing the user with an article having the appearance of a briefcase.

1 Claim, 5 Drawing Figures

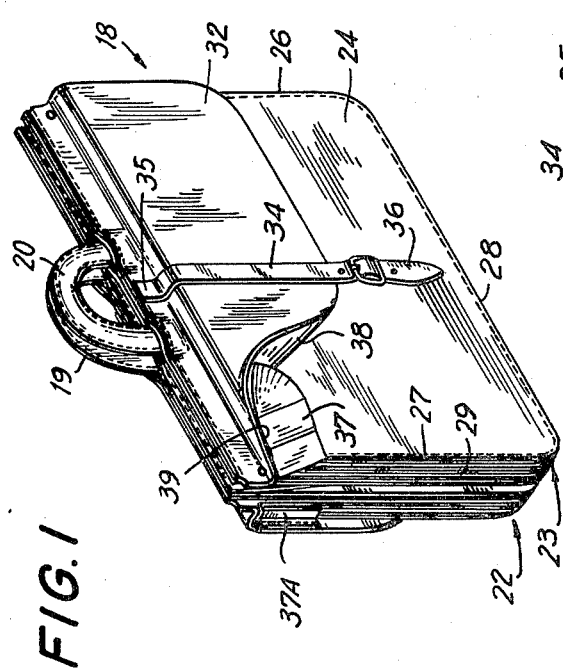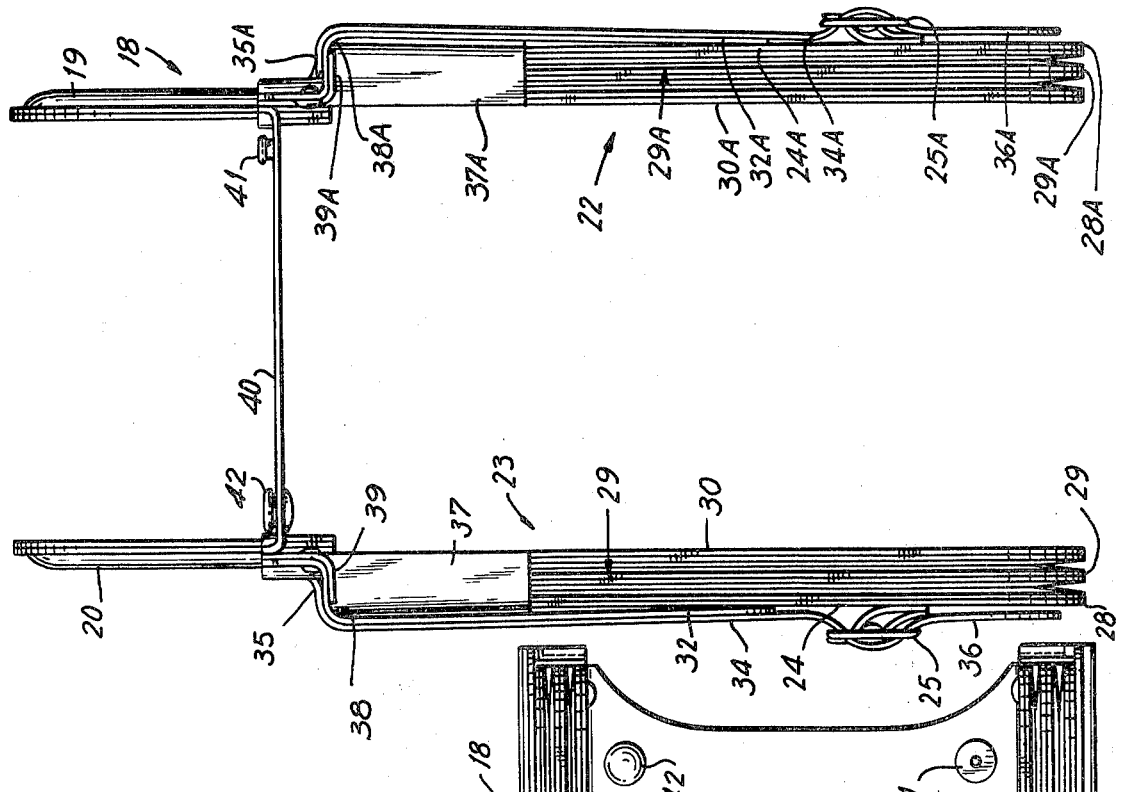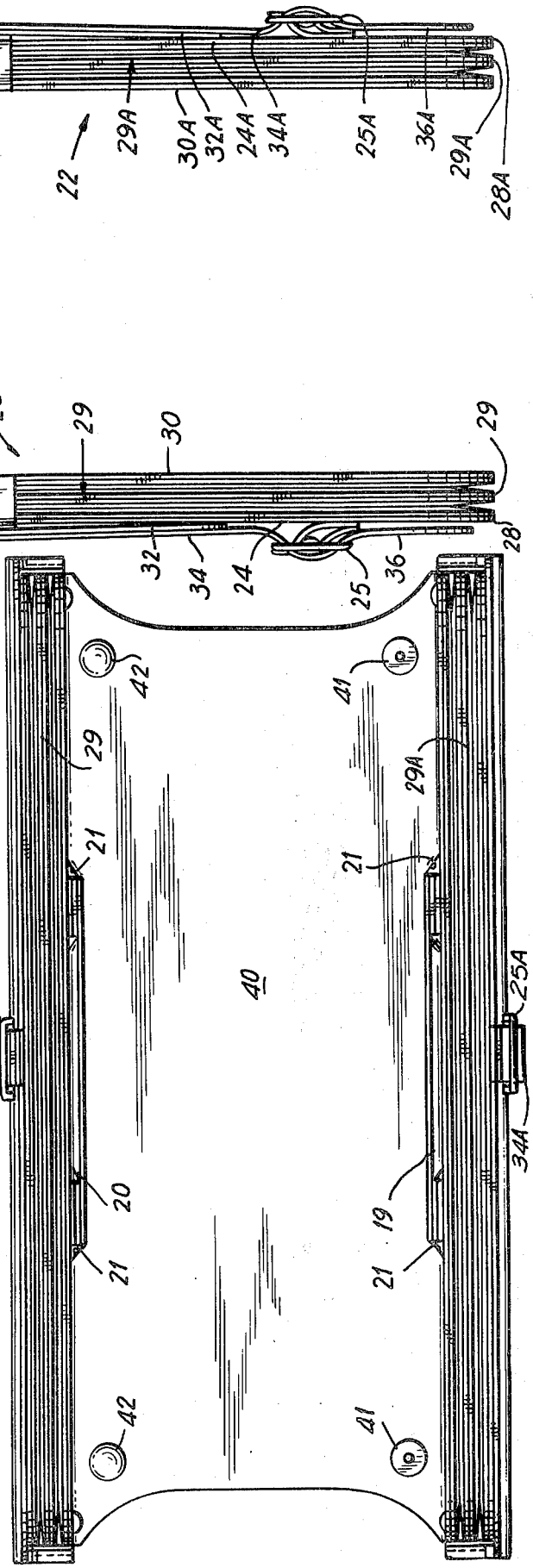

CONVERTIBLE SADDLE BRIEF CASE

This invention relates generally to briefcases, and more particularly to a convertible saddle briefcase for use on and off of a wheeled vehicle, such as a bicycle, or the like.

The remarkable sales successes within the bicycle and bicycle accessory industries has been enjoyed by both suppliers and consumers alike. Never before have both urban and suburban populations taken to these wheeled vehicles to this extent. Bicycle riders, for example, are learning from our neighbors around the world that these non-polluting vehicles provide the user with much needed exercise and rather rapid, efficient transportation to and from business and recreational activities. As might be expected, with increased sales in vehicles, there has been a commensurate increase in sales of all types of accessories for use with these vehicles. Some provide the user with realistic safety aids, while others merely provide yet another means for spending money on the useless and unnecessary.

To the surprise of many in this country, businessmen are learning that the bicycle, for example, provides an opportunity to get places quickly in a way that pays the added dividend of providing a bit of exercise to those usually held captive within an office environment. Traffic jams do not discourage the bicycle rider who is able to bypass the overheated multi-ton vehicles and drivers alike. And yet, a need exists for a briefcase which is particularly adapted to and be easily carried by bicycles, mopeds, motorcycles and similar-type vehicles of various types. Apart from the stuffing briefcases and packages beneath the "rat-trap" rear bicycle luggage carrier, riders do not have available to them on the market an article capable of functioning both as a briefcase and as a saddle-type bag capable of being safely and easily supported upon a wheeled vehicle support member.

It is an object of the present invention to provide a convertible saddle briefcase of the type illustrated and described below.

Another object of the present invention is to provide a briefcase having a pair of housing portions which are separated by a web member which is capable of supporting the entire item upon the support member of a wheeled vehicle, such as a bicycle.

Another object of the present invention is to provide a convertible saddle briefcase which, when used as a briefcase, functions and has the appearance of a conventional saddle briefcase, such that parties viewing this item will not be able to discern the saddlebag capabilities thereof.

Another object of this invention is to provide a combination saddlebag and briefcase structure which is capable of being supported either upon the forward reach or bar of a bicycle, or upon the rear luggage carrier thereof.

The present invention fulfills the aforementioned objects and overcomes limitations and disadvantages of prior art attempts to solve relevant problems by providing a convertible saddle briefcase capable of use as either a saddle-type support bag or a briefcase. A pair of housing receptacles are spaced from one another and joined by a web member which interconnects these housing receptacles at predetermined points thereof. Handles provide means for supporting both of said housing receptacles upon a wheeled vehicle support member such that each housing receptacle may accommodate and hold one or more articles of a selected size and shape. In use as a saddlebag, the web member is capable of supporting these housing receptacles in hanging positions on either side of a vehicle support member. When used as a briefcase, the web member folds from view so that the user is provided with a functional and aesthetically pleasing article having the appearance of a briefcase.

The invention will be more clearly understood from the following description of specific embodiments of the invention, together with the accompanying drawings, wherein similar reference characters denote similar elements throughout the several views, and in which:

FIG. 1 is a perspective view of a convertible saddle briefcase according to the present invention; and illustrating same for use as a briefcase;

FIG. 4 is an end elevational view of the briefcase illustrated in FIG. 3; and

FIG. 5 is a bottom view of the convertible saddle briefcase shown in FIG. 4.

Figure 2:
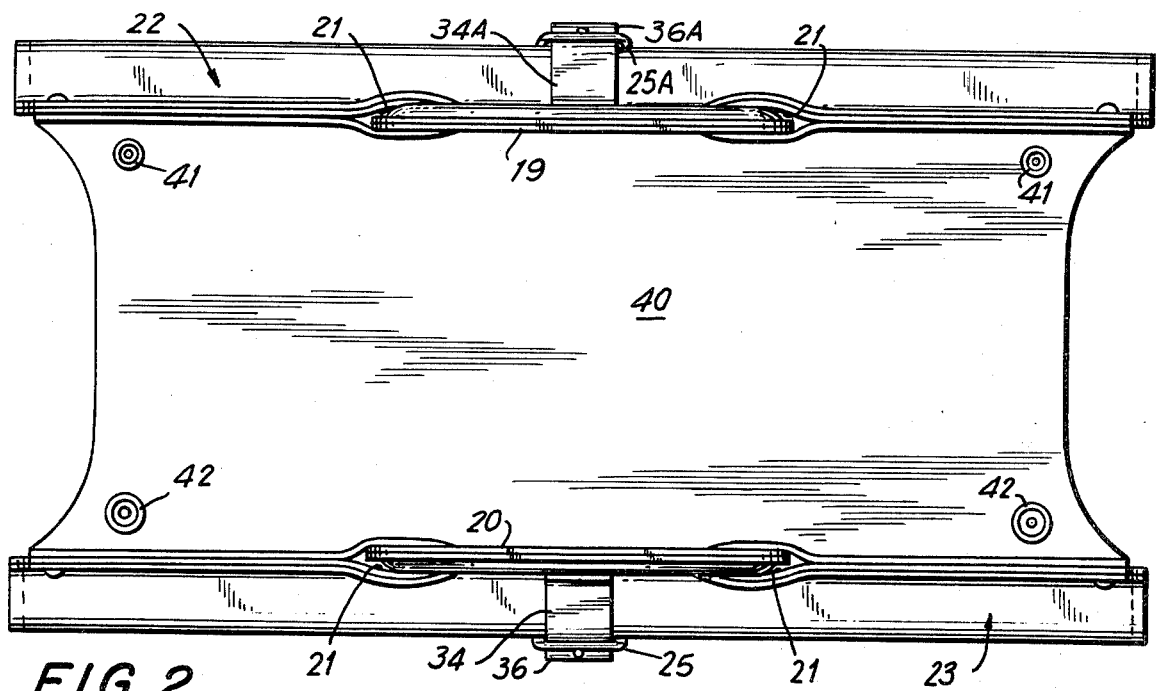
FIG. 2 is a top plan view of the convertible saddle briefcase shown in FIG. 4.

Referring now in more detail to the drawings, let us look for a moment at some of the structural features and details of convertible saddle briefcase 18. FIG. 1 best illustrates, in a perspective-type view, the apperance of this briefcase 18 when in a closed condition in which it assumes the functions and appearance of a briefcase. A pair of handles 19 and 20 are shown in FIG. 1 in a raised, juxtaposed position whereby a hand of the user may easily grip both so as to support or carry briefcase 18. Handles 19 and 20 are supported within openings 21, best seen in FIG. 6 of the drawings. The structural members defining openings 21 will be described in more detail below.

Two separate and distinct compartment cases 22 and 23, respectively, form a part of briefcase 18. Each of compartment cases 22 and 23 comprises a separate and distinct self-contained envelope or housing capable of holding and protecting one or more items of a predetermined size and shape. Compartment case 23 for example, consists of a hunt panel member 24 to which a buckle 25 is secured midway along its length and approximately one-quarter of the distance up from the bottom of compartment case 23 to its upper extremities. Buckle 25 may consist of one of any number of suitable fasteners and, for that matter, it is contemplated that this invention includes the use of the hook-and-loop material marketed under the trademark Velcro. Front panel member 24 is secured at its sides 26 and 27, as well as its bottom edges 28, to an accordion-pleated web member 29. Web member 29 is fastened to front panel member 24 by stitching, heat sealing, adhesive bonding, or other conventional fastening means.

A rear panel member 30 is cooperatively secured to accordion web member 29 in much the same manner as has been described for front panel member 24. The presence of front panel member 24, rear panel member 30 and accordion-pleated web member 29 about the sides and bottoms thereof, forms an expandable pocket 31 therewithin (not specifically shown in the drawings).

Figure 3:
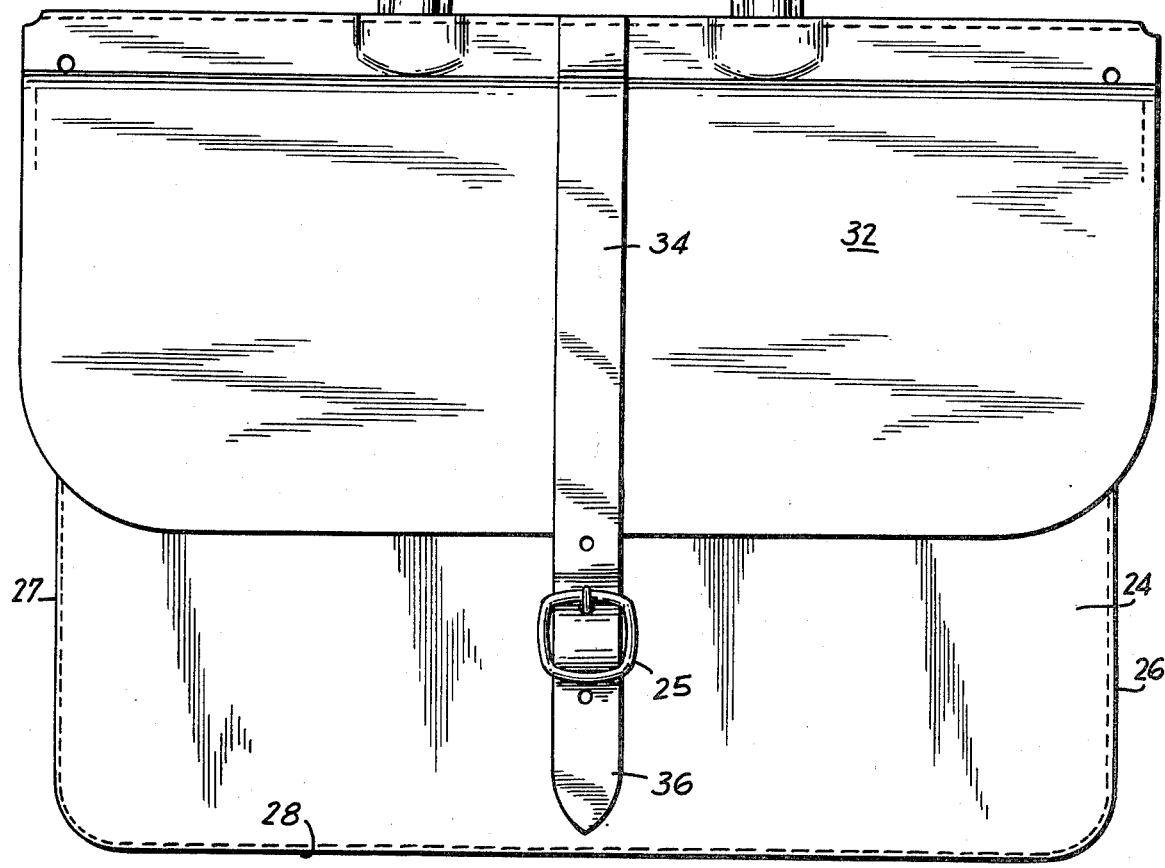
FIG. 3 is a front elevational view of the convertible saddle briefcase shown in FIG. 4.

The contents, if any, and the inner portions of expandable pocket 31, are protected by means of an overlying front flap 32 which extends the entire width of briefcase 18. Flap 32 is secured at its topmost extremities to rear panel member 30 and extends downwardly over the uppermost edges 33 of front panel member 24. In order to assure the maintenance of front flap 32 in a downwardly extending, protective position in which it covers portions of front panel member 24, a strap 34 is provided. In its closed or fastened position shown in FIGS. 3 and 4, for example, strap 34 extends downwardly from its uppermost end 35 to its perforated end 36. As seen in FIGS. 3 and 4, end 36 cooperatively and releasably engages buckle 25 such that the strap 34 may be fastened and unfastened at the will of the user of briefcase 18. A number of openings in end 36 provides for adjustments for predetermined tension within strap 34, and also to provide for expansion of compartment case 23.

In a preferred embodiment of my invention, a side gusset 37 is provided at each side of compartment case 23. Gusset 37 is accordion-pleated and is secured at its upper extremities to the inner surfaces 38 of front flap 32. The seam of interface 39 between gusset 37 and inner surfaces 38 is substantially watertight, so as to provide protection against the entry of a driving rain or moisture directly into expandable pocket 31. This invention contemplates the sealing of all but the bottom edges of gusset 37 to and against front flap 32 and either rear panel member 30 or accordionpleated web member 29. In this way, yet further protection against the elements is realized.

The number of accordion web members corresponding to web member 29 may be varied to provide a predetermined and selected amount of expansion. Thus, a single accordian pleat, utilizing a single accordian web member 29, will provide a limited amount of expansion and will limit the amount of lateral bulge in directions transverse with respect to the general longitudinal direction or plane of briefcase 18. On the other hand, the use of a plurality of web members 29 will facilitate carrying greater amounts of cargo or materials within compartment case 23.

In a preferred embodiment of the present invention, compartment case 22 consists of the same or identical components described above for compartment case 23. In the interests of limiting the size of this specification and in order to provide the reader with a better understanding of this invention, the following elements which make up compartment case 22 are listed adjacent their respective reference characters, namely: front panel member 24A corresponds to front panel member 24; buckle 25A corresponds to buckle 25; side 26A corresponds to side 26; side 27A corresponds to side 27; bottom edges 28A correspond to bottom edges 28; accordion web member 29A corresponds to accordion web member 29; rear panel member 30A corresponds to rear panel member 30; expandable pocket 31A corresponds to expandable pocket 31; front flap 32A corresponds to front flap 32; uppermost edges 33A of front panel member 24A correspond to uppermost edges 33 of front panel member 24; strap 34A corresponds to strap 34; uppermost end 35A corresponds to uppermost end 35; end 36A corresponds to end 36; gusset 37A corresponds to gusset 37; inner surfaces 38A correspond to inner surface 38; and seam 39A corresponds to seam 39.

It should be understood that in the manufacture or fabrication of briefcase 18, two identical compartment cases corresponding to compartment cases 22 and 23 may be fabricated in like manner such that either of these compartment cases may comprise compartment case 22 or compartment case 23, as described above.

A saddle web member 40 extends between and is cooperatively interconnected with compartment cases 22 and 23. Saddle web member 40 may be sewn or riveted to rear panel members 30 and 30A, respectively. Openings 21 are provided between saddle web member 40 and rear panel members 30 and 30A to accommodate the presence of handles 19 and 20. Openings 21 are large enough to facilitate the raising and lowering, where desired, of handles 19 and 20. A pair of male snap fasteners 41 and a pair of female snap fasteners 42 are secured, such as by riveting, to saddle web member 40, as best seen in FIGS. 4, 5 and 6. Male snap fasteners 41 are adapted to matingly engage with female snap fasteners 42 such that, when snapped together, briefcase 18 will assume the configuration of a briefcase 18 best seen in FIG. 3. Similarly, a pulling apart of handles 19 and 20 will result in the unfastening of snap fasteners 41 and 42, to provide the outstretched saddle web member 40, as shown in FIGS. 4, 5 and 6.

The reader will note in FIG. 4 that handles 19 and 20 have been pulled apart so as to unfasten male and female snap fasteners 41 and 42 from one another, and the entire briefcase 18 may thereafter by placed upon the carrier of a bicycle such that saddle web member 40 supports the weight of same upon carrier 13.

In use, the user of my invention is provided with a convertible saddle brief case which exists in the form of convertible saddle briefcase 18. Two briefcase units or compatment cases 22 and 23 are joined by a saddle web member 40 in a manner which permits the entire unit to be set upon and supported by the rear luggage carrier or the forward reach or bar of a wheeled vehicle, such as a bicycle.

Each compartment case 22 and 23 is approximately 11 inches by 17 inches in overall dimensions and each is provided with an accordian-type folding edge construction, facilitated by accordian web members 29 and 29A. This accordion-type folding construction allows each compartment case to expand so as to accommodate papers or other objects. A pair of handles 19 and 20 permit the user to hand-carry the convertible saddle briefcase as he or she would carry an ordinary briefcase.

The convertible saddle briefcase according to this invention is constructed in a manner which permits it to assume a folded condition, when not in use upon a wheeled vehicle. Pairs of grommet-type male and female snap fasteners may be provided to hold compartment cases 22 and 23 and the intermediate web 40 together such that the entire unit looks and functions like a conventional briefcase when it is hand-carried. Upon pulling of handles 19 and 20 apare, these male and female snap fasterners may be opened such that web 40 assumes a flat configuration, thereby permitting same to be placed upon a bicycle luggage rack where it can be held in place either by the "rat-trap" spring-loaded clip customarily built into such carriers, or by one or more elastic bands or shock cords ususlly sold for such purposes.

The upper edges of the briefcase front flaps 32 and 32A cooperate with gussets 37 and 37A so as to overlap the accordian web members 29 and 29A of compartment cases 22 and 23. This prevents the entry of rain or snow when the unit is used in inclement weather. Handles 19 and 20 are of the retractable type.

Convertible saddle briefcase 18 may be constructed of any number of materials, such as leather, vinyl, vinyl or other plastic-coated fabric, canvas, or combinations of same. This invention also contemplates the use of a shoulder strap in addition to handles 19 and 20, to provide the user with yet another means of supporting same either upon his or her shoulder and/or upon bicycle 10.

The embodiment of the invention particularly sidclosed and described is presented merely as an example of this invention. Other embodiments, forms and modifications of my invention coming within the proper scope and spirit of the appended claims will, of course, readily suggest themselves to those skilled in the art.

What is claimed is:

1. A convertible receptacle capable of being used with wheeled vehicles having a support member, comprising, in combination: a first housing portion operationally defining a first receiving compartment therewithin; a second housing portion operationally defining a second receiving compartment therewithin; a web portion integral with and interconnecting said first and second housing portions; a first handle portion associated with and secured to said first housing portion; a second handle portion associated with and secured to said second housing portion; and snap means integral with said housing portions for removably holding said first and second housing portions in a proximate relationship with respect to one another; said first housing portion including front and rear walls interconnected by opposing side and bottom walls, said side and bottom walls being formed with a plurality of collapsible portions thereof to permit expansion of said front and rear walls away from one another, a flap member integral with said rear wall extending in overlapping relationship with respect to said front wall, thereby covering uppermost extremities of said front and side walls and an access opening defined thereby, a fastener member integral with said front wall and accessible to a user of the convertible receptacle, a fastener portion of said flap member extending to said fastener member, said fastener portion including fastening means cooperative with respect to said fastener member for enabling the user to secure said fastener member and said fastening means together, and a pair of guard means integral with and depending from opposite inside border surfaces of said flap member, said guard means comprising material capable of collapsing and expanding to cover paths of undesirable elements of the weather to inner portions of said first receiving compartment, said guard means covering upper extremities of said side walls, said second housing portion including front and rear walls interconnected by opposing side and bottom walls, said side and bottom walls being formed with a plurality of collapsible portions thereof to permit expansion of said front and rear walls away from one another, a flap member integral with said rear wall and extending in overlapping relationship with respect to said front wall, thereby covering uppermost extremities of said front and side walls and an access opening defined thereby, a fastener member integral with said front wall and accessible to a user of the convertible receptacle, a fastener portion of said flap member extending from said rear all over said flap member to said fastener member, said fastener portion including a fastening means cooperative with respect to said fastener member for enabling the user to secure said fastener member and said fastening means together, and a pair of guard means integral with and depending from opposite inside border surfaces of said flap member, said guard means comprising materials capable of collapsing and expanding to cover paths of undesirable elements of the weather to inner portions of said first receiving compartment, said guard means covering upper extremities of said side walls, said web portion being formed with handle openings therethrough adjacent said first and second housing portion rear walls, said first and second handle portions extending through said handle openings and being capable of movement between usable and retracted positions, said first and second handle means being shaped to permit their being comfortably and simultaneously grasped by one hand of the user, said web member being capable of supporting said housing portions from a wheeled vehicle support member and being further capable of folding from view to provide the user with an article having the appearance and characteristics of a carrying bag.

* * * * *